Feb. 25, 1964 G. E. WALTERS 3,122,283
ROW CROP SEED PLANTER
Filed Feb. 19, 1959 2 Sheets-Sheet 1

INVENTOR.
GEORGE E. WALTERS
BY McGrew & Edwards
ATTORNEYS

Feb. 25, 1964 G. E. WALTERS 3,122,283
ROW CROP SEED PLANTER
Filed Feb. 19, 1959 2 Sheets-Sheet 2
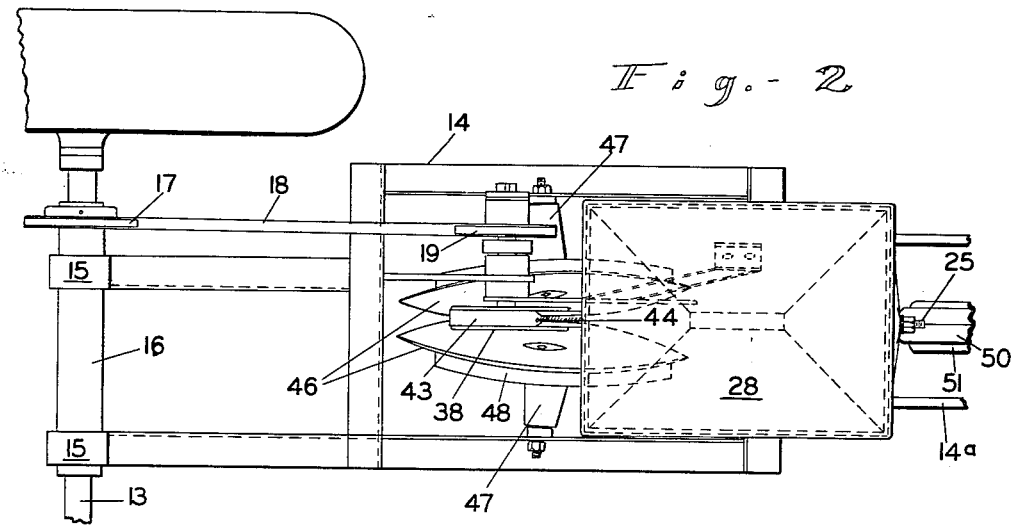
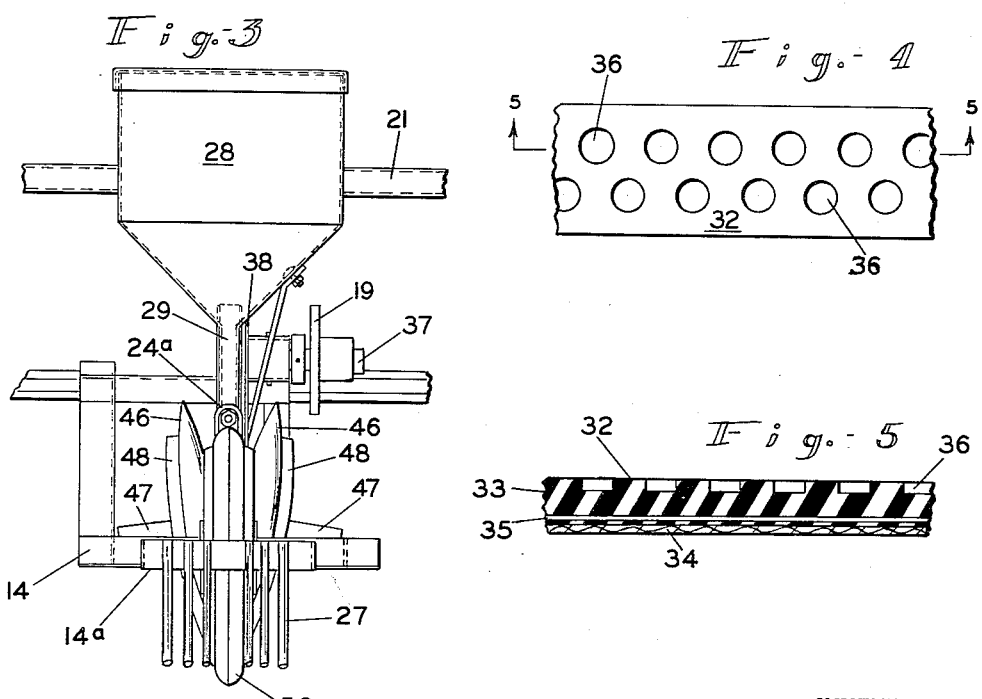
INVENTOR.
GEORGE E. WALTERS
BY
ATTORNEYS United States Patent Office 3,122,283
Patented Feb. 25, 1964

3,122,283
ROW CROP SEED PLANTER
George E. Walters, Denver, Colo., assignor to The Great Western Sugar Company, Denver, Colo., a corporation of New Jersey
Filed Feb. 19, 1959, Ser. No. 794,289
4 Claims. (Cl. 222—371)

This invention relates to seed drills or planters, and more particularly to seed planters for row crop planting, such as sugar beets, for example.

Seed planting of row crops may be performed in a variety of ways. Some are known as hill planting seeders, depositing a plurality of seed in a hill, with the hills placed at regular intervals along the row. Other planters deposit single seeds at predetermined intervals along a row. The present invention is in the latter category.

In sugar beet growing, most of the operation from plowing to harvesting is mechanized and includes such operations as plowing, land leveling, planting, thinning or blocking, cultivating and harvesting. In order to make such operations economical, the equipment utilized in such operations should be adapted to perform a plurality of such operations by a simple and low cost modification procedure in order that the beet grower is not subjected to undue expense in having the necessary equipment to plant, raise and harvest the crop. Other crops such as corn and peanuts are in the same category and the planter should be able to feed any such seed.

It is an object of my invention to provide simple, durable and efficient apparatus for selectively placing seeds of row crops accurately in a row.

Another object of this invention is to provide simple, durable and efficient apparatus for placing seeds at uniform intervals along a furrow or row.

A further object of my invention is to provide apparatus which is adapted for planting seeds of row crops in a variety of sizes and requires only a belt interchange to adapt it for one use or another.

Still another object of my invention is to provide a simple, durable and efficient apparatus for feeding single seeds in a series of cells formed on a belt which delivers and discharges the seeds in a furrow at substantially uniform intervals.

Other objects reside in novel details of construction and novel combinations and arrangement of parts, all of which will be fully described in the course of the following description.

The accompanying drawings illustrate a typical apparatus for the practice of my invention. In the drawings, in the several views of which like parts have been given similar reference numerals, FIG. 1 is a side elevation of apparatus according to my invention and partially broken to show the arrangement of interior parts;

FIG. 2 is a top plan view of the seed hopper and feed mechanism of FIG. 1;

FIG. 3 is a rear elevation of the seed hopper and feed mechanism of FIG. 2;

FIG. 4 is a fragmentary plan of the feed belt and cells of the feed mechanism shown in FIG. 1; and FIG. 5 is a section taken along the line 5—5, FIG. 4.

Figure 1:
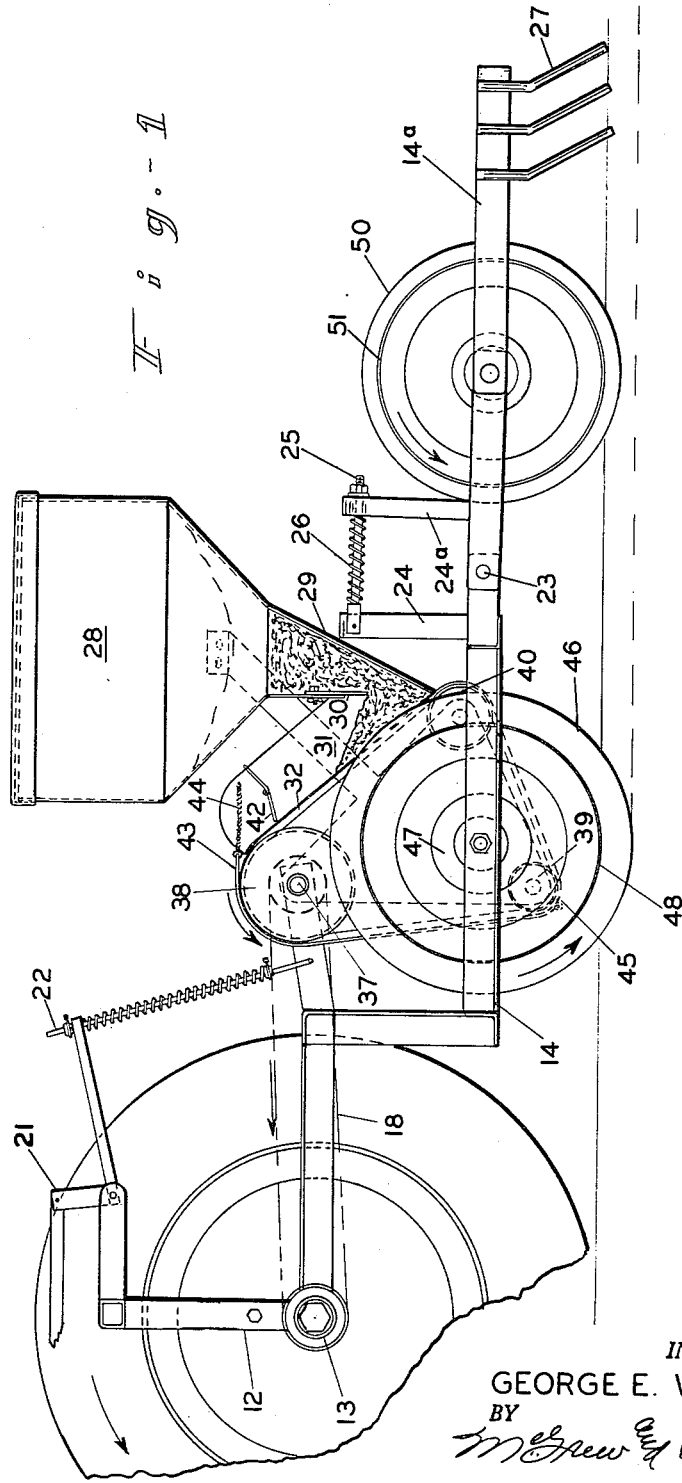

As shown in FIG. 1, the apparatus of the present invention is in the form of an attachment which is mounted on a wheel-supported frame 12 of a row crop thinner, such as the well known "G.W. Thinner," which usually is a four row or six row unit and has a drive shaft 13, driven by the wheels of the wheel-supported frame 12 which is pulled or transported by a tractor or other vehicle on which it is mounted so as to provide a rate of rotation of shaft 13 corresponding to the rate of vehicle movement.

The attachment includes an elongated frame 14 having pivotal connections 15 with the housing 16 of shaft 13 (FIG. 2) and a sprocket 17 carried by shaft 13 and a chain transmission 18 drives another sprocket 19 mounted on frame 14. A lift mechanism 21 on frame 12 has a spring mounted rod 22 connected with frame 14 so that said frame may be elevated while turning at the ends of rows and elsewhere where it needs to clear obstacles. A rear section 14a is attached to frame 14 by means of a hinge at the center of the press wheel 50 which in turn is hinged to frame 14 at 23. A lug 24 on frame 14 and another 24a on section 14a are interconnected by a rod 25 which may be drawn against the resistance of a spring 26, or extended to selectively vary the effective elevation of the press wheel. A series of tines 27 comprising a raking unit at the rear end of section 14a is hinged at the center of the press wheel 50 for maintaining the raking member at operational level.

A seed hopper 28 terminates at its lower end in a V-shaped discharge portion 29. An adjustable baffle or gate 30 restricts the flow of seed from the hopper 28 into the upwardly ranging section 31 of portion 29, which preferably is clear plastic or glass-sided as shown to permit observation of the amount of fill. The bottom edge of the baffle or gate 30 forms a seed cut off by restricting the flow between the baffle and the back of the seed hopper at 29. Section 31 has an open bottom and a stretch of a seed carrier belt 32 runs in said bottom and keeps the mass of seeds agitated. The setting of gate 30 determines the height to which the bed of seed descending from hopper 28 can stand over the open bottom of section 31 through which belt 32 passes.

The belt 32 may be of any suitable material and preferably is rubber 33 with a duck back 34 and a nylon stretch cord 35 (FIG. 5). It has a series of recesses or cells 36 of uniform diameter arranged in two rows as shown in FIG. 4, although a single row may be used, if desired. The two row arrangement permits the same uniform spacing in the respective rows with the centers of one row midway between the centers of the adjoining row lengthwise of the belt to assure uniform spacing at discharge and a large capacity fill in a short length of belt.

In a typical installation, a belt as shown in FIG. 4 has the cells 36 spaced one-half inch apart in each row and the cell positions of one row are offset with respect to the cells of the adjoining row so that the actual space between cells lengthwise of the belt is one-quarter inch. The belt moves at one-fourth ground speed to provide one inch seed spacing along the row. Changes in cell spacing along the belt or changes in sprocket size to vary the speed of the belt may be utilized to provide different but uniform seed spacing in the furrow and changes in diameter of the cells will accommodate different sized seeds of various crops.

The belt is driven by a pulley 38 keyed on the shaft 37 on which sprocket 19 is mounted (FIG. 3) and extends around a lower idler 39 and an intermediate idler 40. The stretch of belt 32 comprising the bottom of upwardly ranging section 31 of the hopper discharge portion slopes at approximately 50° to the horizontal and provides a gravity cutoff for the seed where the top of the seed bed thins at its top adjacent belt 32. The 50° angle can be changed by an adjustment mechanism which is attached to frame 14 to raise or lower the cut off point of the seed in section 31. This prevents excess seeds from piling up at the point where the belt leaves the bed. A spring steel wire 42 is disposed as a scraper immediately above the gravity cutoff point and removes any excess seed which occasionally lodges in one of the cells 36. The lower end of the scraper has a close clearance with the belt to permit uninterrupted passage of a single seed in a cell.

A spring steel retainer band 43 is held in place by a spring 44 and extends from a covering position over drive pulley 38 to a discharge point 45 at the under surface of idler 39. The lower end of retainer band 43 includes a curved portion acting as a lip across which the seed travels as sheave 39 flexes the belt 32 and expands cells 36 adjacent discharge point 45. Sheave 39 is crowned in order that the belt 32 will be flexed both parallel and at right angles to its course of travel. This double flexing of the belt 32 facilitates the ejection of the seed at the desired discharge point. The seed filling cells 36 as the belt leaves section 31 passes under the retainer band 43 and is held in the cells during passage through the vertical stretch until it reaches point 45 where it ejects from the cells at a slight inclination to the vertical under the impelling force of idler 39 and direction of the curvature of band 43 and thus deposits at uniformly spaced intervals along the furrow without being windblown or scattered. The direction of seed discharge is counter to the direction of the tractor as indicated by the arrows in FIG. 1, which provides a controlled spreading of the seed between the belt position and the deposit position in the furrow.

A pair of disc plows 46 is journalled for rotation in associated bearings 47 mounted on frame 14 at an inclination to position the forward earth contacting surfaces of the plows in close adjacency and form an enclosure which widens rearwardly and upwardly from such position. Each plow has an annular flange 48 on its outer surface acting as a depth limit band to control furrow depth and the front spacing of the plows determines the furrow width. The belt and discharge assembly extends into the plow enclosure with the discharge point 45 only slightly above the top of the furrow as indicated by the position of flange 48 in FIG. 1.

The wheel 50 supporting frame section 14a is a press wheel for pressing soil on the seed deposited in the furrow to cover it and hold it in place along the row. The raking unit 27 is aligned with press wheel 50 and moves loose dirt over the covered seed. A pair of flanges 51 on wheel 50 determines the press position in the furrow and also assists in firming the soil around the deposited seed.

In a typical installation, four or six of such attachments will be mounted on the thinner frame 12. The hoppers 28 will have their gates 30 positioned to provide a desired flow of seed to each belt 32 and will be filled according to the requirements of the seeding operation. The tractor on which thinner frame 12 is mounted is operated at its regular operating speed and the spacing of the cells 36 in belt 32 is determined with respect to such speed to provide a backward ejection of the seed as it leaves the belt which partially offsets the forward impetus given the seed by the forward speed of the planter and results in substantially a dead drop of the seed in the furrow.

The following press wheel moves some of the soil at the side of the furrow onto the deposited seed and firms the soil about the seed, while the rake unit 27 moves additional soil into the furrow to provide adequate cover for germination requirements. This action continues along the row and when the end of the row is reached, mechanism 21 is operated by the tractor operator to lift the attachment assembly and hold it above obstacles until the tractor again begins an advance along a new set of rows.

When the seed planting for a given crop planting is completed, the hopper may be emptied and another belt substituted for the belt 32 to meet the furrow spacing requirement of the next crop. Adjustment of gate 30 may be made to satisfy the fill requirement of section 31. The filling arrangement of hopper 28 is so efficient that very few empty or double filled cells pass behind retainer 43 during a long period of operation and the discharge action deposits single seeds at uniformly spaced intervals without appreciable scattering by wind or mechanical action. In preferred practice, the planter is an attachment for a thinner mechanism, but it will be understood that it may be made as a complete unit, which is pulled by a tractor or other prime mover with the drive frame 12 and shaft 13 comprising a part of the planter assembly.

I claim:

1. In a seed planter for row crops, a flexible, endless belt mounted in triangular arrangement on an upper sheave, a lower sheave and an intermediate sheave, means on the planter in driving relation to one of the aforesaid sheaves and arranged to rotate said belt from the upper sheave to the lower sheave, thence to the intermediate sheave and upwardly over the upper sheave, said belt having a plurality of seed-receiving recesses of uniform dimension at uniform intervals along its exterior surface, means mounted on the planter adjacent the belt stretch extending between the intermediate and upper sheaves constructed and arranged to deposit a single seed in each said recess, said lower sheave being constructed and arranged to flex the belt and spread the recesses for seed release while the belt remains in the plane of its course of travel over said sheave, and a cover mounted on the planter and disposed in close proximity to the stretch of the belt disposed between the upper and lower sheaves for confining the seeds in the recesses during belt travel from the upper sheave to the lower sheave, said cover having its lower end at approximately the lowest elevation of the belt and disposed to direct a seed discharging from a flexed recess at the lowermost point of belt travel in a direction opposite to the planter travel directly into a crop row.

2. In a seed planter for row crops, a flexible, endless belt mounted in triangular arrangement on an upper sheave, a lower sheave and an intermediate sheave, means on the planter in driving relation to one of the aforesaid sheaves and arranged to rotate said belt from the upper sheave to the lower sheave, thence to the intermediate sheave and upwardly over the upper sheave, said belt having a plurality of seed-receiving recesses of uniform dimension at uniform intervals along its exterior surface, means mounted on the planter adjacent the belt stretch extending between the intermediate and upper sheaves constructed and arranged to deposit a single seed in each said recess, said lower sheave being constructed and arranged to flex the belt at substantially right angles to its course of travel and thereby spread the recesses for seed release to eject contained seeds, and a cover mounted on the planter and disposed in close proximity to the stretch of the belt disposed between the upper and lower sheaves for confining the seeds in the recesses during belt travel from the upper sheave to the lower sheave, said cover having its lower end at approximately the lowest elevation of the belt and disposed to direct a seed discharging from a flexed recess at the lowermost point of belt travel in a direction opposite to the planter travel directly into a crop row.

3. In a seed planter for row crops, a flexible, endless belt mounted in triangular arrangement on an upper sheave, a lower sheave and an intermediate sheave, means on the planter in driving relation to one of the aforesaid sheaves and arranged to rotate said belt from the upper sheave to the lower sheave, thence to the intermediate sheave and upwardly over the upper sheave, said belt having a plurality of seed-receiving recesses of uniform dimension at uniform intervals along its exterior surface, means mounted on the planter adjacent the belt stretch extending between the intermediate and upper sheaves constructed and arranged to deposit a single seed in each said recess, a second means disposed on the planter to bear against and flex said belt outwardly at the lowermost position of its rotation so as to enlarge a juxtaposed recess therein and eject its contained seed, and a cover mounted on the planter and disposed in close proximity to the stretch of the belt disposed between the upper and lower sheaves for confining the seeds in the recess during belt travel from the upper sheave to the lower sheave, said cover having its lower end at approximately the lowest elevation of the belt and terminating in a curved portion directed rearwardly of the course of planter travel so as to direct seeds released by flexing said recesses in a rearwardly directed course directly into a crop row.

4. In a seed planter for row crops, a seed pickup and discharging assembly mounted on the planter including a seed storage receptacle, an endless band of elastic material supported for rotation on the planter in a circumferential path and having spaced circumferentially alined apertures in its outer surface of a size corresponding to the particle size of the seed in said receptacle, means connected to said band to rotate the band in its circumferential path, means for directing single seeds from the receptacle to enter each of said apertures in an upper position of the band rotation, cover means associated with said band for confining the seeds in the apertures between their entry and discharge positions and including a curved portion at its lower end extending to approximately the lowest elevation of the band and disposed to direct a seed discharging from a flexed recess in a direction opposite to the planter travel, and a second means disposed on the planter to bear aganist and flex said band outwardly at the lowermost position of its rotation so as to enlarge a juxtaposed aperture therein and eject its contained seed directly into a crop row over which the planter is moving.

References Cited in the file of this patent

UNITED STATES PATENTS

| | | |
|---|---|---|
| 1,161,369 | Ayers | Nov. 23, 1915 |
| 1,264,454 | Terrell | Apr. 30, 1918 |
| 1,761,065 | Bausman | June 3, 1930 |
| 1,771,516 | Wentz | July 29, 1930 |
| 2,141,044 | Rassmann | Dec. 20, 1938 |
| 2,310,819 | Van Orden | Feb. 9, 1943 |
| 2,605,023 | Ward | July 29, 1952 |
| 2,684,781 | Allen et al. | July 27, 1954 |
| 2,770,400 | Mattson | Nov. 13, 1956 |
| 2,871,805 | Behnen | Feb. 3, 1959 |
| 3,022,755 | Roepke | Feb. 27, 1962 |

FOREIGN PATENTS

| | | |
|---|---|---|
| 81,633 | Denmark | Aug. 6, 1956 |
| 500,972 | Belgium | Feb. 15, 1951 |
| 1,004,742 | France | Nov. 28, 1951 |
| 1,044,034 | France | June 17, 1953 |